United States Patent
Aggarwal

(10) Patent No.: US 7,684,963 B2
(45) Date of Patent: Mar. 23, 2010

(54) SYSTEMS AND METHODS OF DATA TRAFFIC GENERATION VIA DENSITY ESTIMATION USING SVD

(75) Inventor: Charu Aggarwal, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 11/092,495

(22) Filed: Mar. 29, 2005

(65) Prior Publication Data

US 2006/0242610 A1   Oct. 26, 2006

(51) Int. Cl.
*G06F 7/60* (2006.01)
*G06K 9/62* (2006.01)

(52) U.S. Cl. .......................................... 703/2; 382/225
(58) Field of Classification Search ..................... 703/2; 382/225
See application file for complete search history.

(56) References Cited

U.S. PATENT DOCUMENTS

| 5,835,891 | A  | * | 11/1998 | Stoneking | 702/117 |
|-----------|----|---|---------|-----------|---------|
| 6,058,205 | A  | * | 5/2000  | Bahl et al. | 382/159 |
| 6,289,354 | B1 | * | 9/2001  | Aggarwal et al. | 707/104.1 |
| 6,307,965 | B1 | * | 10/2001 | Aggarwal et al. | 382/225 |
| 6,327,581 | B1 | * | 12/2001 | Platt | 706/12 |
| 6,741,983 | B1 | * | 5/2004  | Birdwell et al. | 707/5 |
| 6,850,871 | B1 | * | 2/2005  | Barford et al. | 703/2 |
| 7,412,429 | B1 | * | 8/2008  | Syeda-Mahmood et al. | 706/45 |
| 7,437,397 | B1 | * | 10/2008 | Koudas et al. | 708/422 |
| 2003/0018594 | A1 | * | 1/2003  | Aggarwal | 706/12 |
| 2003/0233224 | A1 | * | 12/2003 | Marchisio et al. | 704/4 |
| 2004/0107386 | A1 | * | 6/2004  | Burdick et al. | 714/38 |
| 2004/0117403 | A1 | * | 6/2004  | Horn et al. | 707/104.1 |
| 2004/0220944 | A1 | * | 11/2004 | Behrens et al. | 707/100 |
| 2004/0250188 | A1 | * | 12/2004 | Aggarwal | 714/738 |
| 2004/0260663 | A1 | * | 12/2004 | Aggarwal et al. | 706/20 |
| 2004/0267773 | A1 | * | 12/2004 | Levine et al. | 707/100 |
| 2005/0049826 | A1 | * | 3/2005  | Zhang | 702/179 |
| 2005/0086185 | A1 | * | 4/2005  | Achlioptas et al. | 706/15 |
| 2006/0200431 | A1 | * | 9/2006  | Dwork et al. | 706/12 |
| 2009/0132568 | A1 | * | 5/2009  | Syeda-Mahmood et al. | 707/101 |

OTHER PUBLICATIONS

"WaveCluster: a wavelet-based clustering approach for spatial data in very large databases" by Gholamhosein Sheikholeslami et al The VLDB Journal ACM 2000.*
"Handbook of Simulation" by Jerry Banks (p. 139-148 & 161) 1998.*
A Framework for Clustering Evolving Data Streams; Charu C. Aggarwal et al; Proceedings of the 29th VLDB Conference, Berlin, Germany, 2003 p. 1-12.*
A Framework for Clustering Evolving Data Streams; Charu C. Aggarwal et al; Proceedings of the 29th VLDB Conference, Berlin, Germany, 2003 p. 1-12; Copy provided in previous office action dated Aug. 5, 2008.*

(Continued)

*Primary Examiner*—Kamini S Shah
*Assistant Examiner*—Akash Saxena
(74) *Attorney, Agent, or Firm*—Ference & Associates LLC

(57) ABSTRACT

Systems and methods for providing density-based traffic generation. Data are clustered to create partitions, and transforms of clustered data are constructed in a transformed space. Data points are generated via employing grid discretization in the transformed space, and density estimates of the generated data points are employed to generate synthetic pseudo-points.

9 Claims, 6 Drawing Sheets

OTHER PUBLICATIONS

"WaveCluster: a wavelet-based clustering approach for spatial data in very large databases" by Gholamhosein Sheikholeslami et al The VLDB Journal ACM 2000, Copy on IFW file, previous cited.*

Charu C. Aggarwal, A Framework for Diagnosing Changes in Evolving Data Streams, SIGMOD 2003, Jun. 9-12, 2003, San Diego, CA.

Tian Zhang, Raghu Ramakrishnan and Miron Livny, Fast Density Estimation Using CF-kernel for Very Large Databases, KDD-99, 1999, 312-316, San Diego, CA USA.

* cited by examiner

SYSTEMS AND METHODS OF DATA TRAFFIC GENERATION VIA DENSITY ESTIMATION USING SVD

This invention was made with Government support under Contract No.: TIA H98230-04-3-0001 awarded by the U.S. Department of Defense. The Government has certain rights in this invention.

FIELD OF THE INVENTION

The present invention generally relates to a method for data generation with systematic modelling.

BACKGROUND OF THE INVENTION

In many data mining applications, a critical part of learning the quality of the results is the testing process. In the testing process, one typically applies the data mining approach to a variety of real data sets. The results from these tests can provide a variety of quantifications and insights into the data mining process. Often, in order to explore such quantifications, it is necessary to test the data mining applications in a variety of ways. For this purpose, synthetic data sets are often quite useful. This is because synthetic data sets can be generated using a wide range of parameters. The use of parameters for changing the nature of the underlying data sets is useful in many scenarios in which the sensitivity of algorithms needs to be tested. Representative publications showing conventional arrangements of possible interest are: C. C. Aggarwal, "A Framework for Diagnosing Changes in Evolving Data Streams", ACM SIGMOD 2003; and T. Zhang et al., "Fast Density Estimation Using CF-Kernel for Very Large Databases", ACM KDD Conference, 1999.

While synthetic data sets have the advantage of being tunable in a wide variety of ways, they are often not as realistic as the data sets obtained in real applications. On the other hand, real data sets have the disadvantage that it is difficult the to vary the behavior of the data set without losing the effectiveness of the underlying data mining algorithm.

This leads to the question as to whether it is possible to generate data sets which have similar characteristics to those in the real domain. Such a problem is related to that of traffic generation in which one generates the new data set using the characteristics of the underlying real data set. Accordingly, a need has been recognized in connection with addressing this and related issues.

SUMMARY OF THE INVENTION

In accordance with at least one presently preferred embodiment of the present invention, there is broadly contemplated herein a system and method for traffic generation with density estimation. The methods discussed herein can perform traffic generation by estimating the density of a real data set, and applying a variety of functional forms in order to re-generate the resulting data sets. The use of such functional forms can change the nature of the data set generated using the density estimation process. In addition, it is possible to use a variety of parameters in order to change the nature of the data set which is generated from the process. For example, the new data set may have a much larger number of points, much larger or smaller clusters, many more or many fewer data points, and so on. In general, any variation of the data set can be constructed as long as it utilizes the underlying density of the generation process. Another variation which can be used in order to change the nature of the generated data is to add noise to the density. The process of addition of noise can improve the quality of the data generated considerably.

In addition, the technique can also be extended to the case of data streams. The data stream problem has received considerable importance in recent years because of its applicability to a wide variety of problems. In many cases, it is desirable to simulate a quickly evolving data stream by using both temporal and static evolution. The density estimation process can be used effectively for such a scenario since it is possible to combine the density estimates over multiple points in the data stream in order to make a final generation of the stream. It is also possible o change the nature of the combination over time in order to model evolution of the underlying data stream. Such a modelling of the evolution can be useful in a wide variety of scenarios, in which the data stream is continuously changing in terms of the probability distribution. In such cases, the set of data points which are generated can be made to continuously evolve over time. The continuous evolution of the data points is an important element in the testing several data mining algorithms.

Stated briefly, there is broadly contemplated in accordance with at least one presently preferred embodiment of the present invention a construction of density estimates of underlying data in order to construct synthetic data which simulates the distribution of a real data set. In addition, it is possible to add variations to the synthetic data set, so that a variety of algorithms can be tested.

In summary, one aspect of the invention provides a method of providing density-based traffic generation, said method comprising the steps of: clustering data to create partitions; constructing transforms of clustered data in a transformed space; generating data points via employing grid discretization in the transformed space; and employing density estimates of the generated data points to generate synthetic pseudo-points.

Another aspect of the invention provides an apparatus for providing density-based traffic generation, said apparatus comprising: an arrangement for clustering data to create partitions; an arrangement for constructing transforms of clustered data in a transformed space; an arrangement for generating data points via employing grid discretization in the transformed space; and an arrangement for employing density estimates of the generated data points to generate synthetic pseudo-points.

Furthermore, an additional aspect of the invention provides a program storage device readable by machine, tangibly embodying a program of instructions executed by the machine to perform method steps for providing density-based traffic generation, said method comprising the steps of: clustering data to create partitions; constructing transforms of clustered data in a transformed space; generating data points via employing grid discretization in the transformed space; and employing density estimates of the generated data points to generate synthetic pseudo-points.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
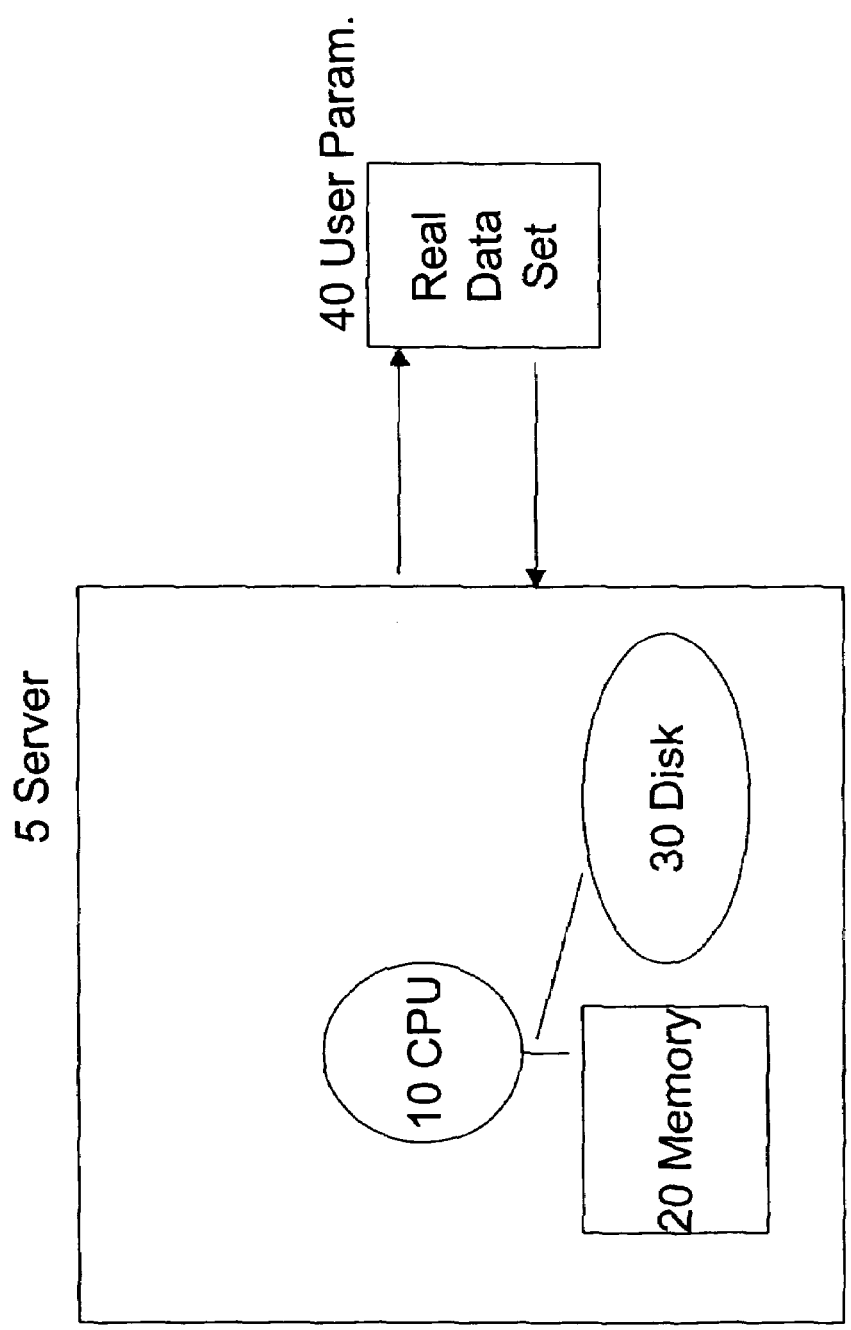
FIG. 1 is a schematic illustration of an architecture.

In FIG. 1, a detailed architecture in accordance with at least one embodiment of the present invention is shown. It contains a CPU (10), memory (20), and disk (30) in a server (5). The computations for the generation of the synthetic data set are performed at the server end. The real data set may be stored at the client end (40), which may be sent to the server 5 over a network. The server 5 uses this real data set in order to perform the computations. After construction of the synthetic data set, it is sent back to the server 5. This synthetic data set may be used for a variety of purposes such as data mining computations and simulations.

Figure 2:
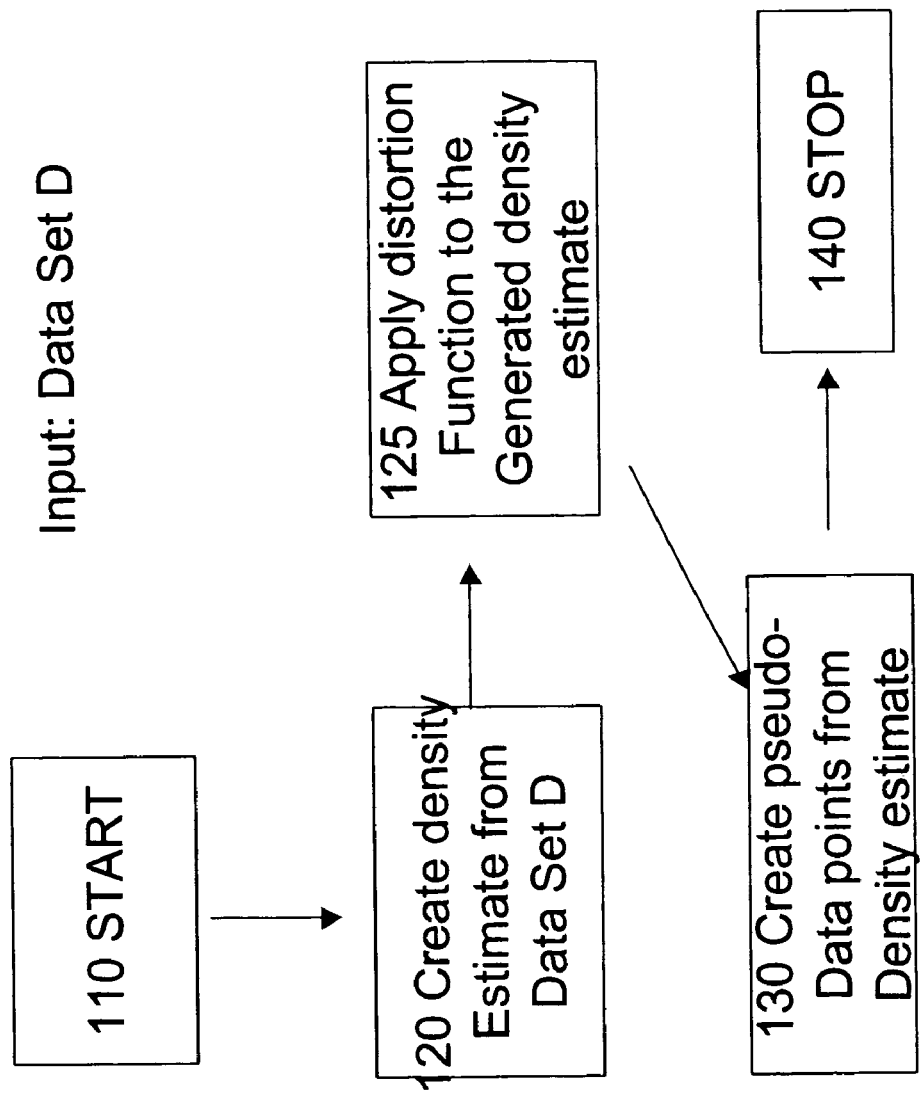
FIG. 2 is a schematic illustration of an overall process for constructing data points synthetically.

In FIG. 2, there is illustrated an overall process, starting at 110 and ending at 140, for the construction of a synthetic data set from the real data set along with the corresponding distortion parameters. In step 120, a density estimate is preferably created from the data set D. (This step is addressed in more particularity in FIG. 3.) In step 125, a distortion function is applied to the density estimate. (This step is addressed in more particularity in FIG. 5.) In step 130, the generated density estimate is used in order to construct the final set of synthetic data points. Preferably, the density estimate is used to create- the pseudo points by repeatedly sampling grid points with probability proportional to the corresponding density. Once the grid points have been sampled the data points are preferably generated by adding noise to the coordinates of the grid points.

Figure 3:
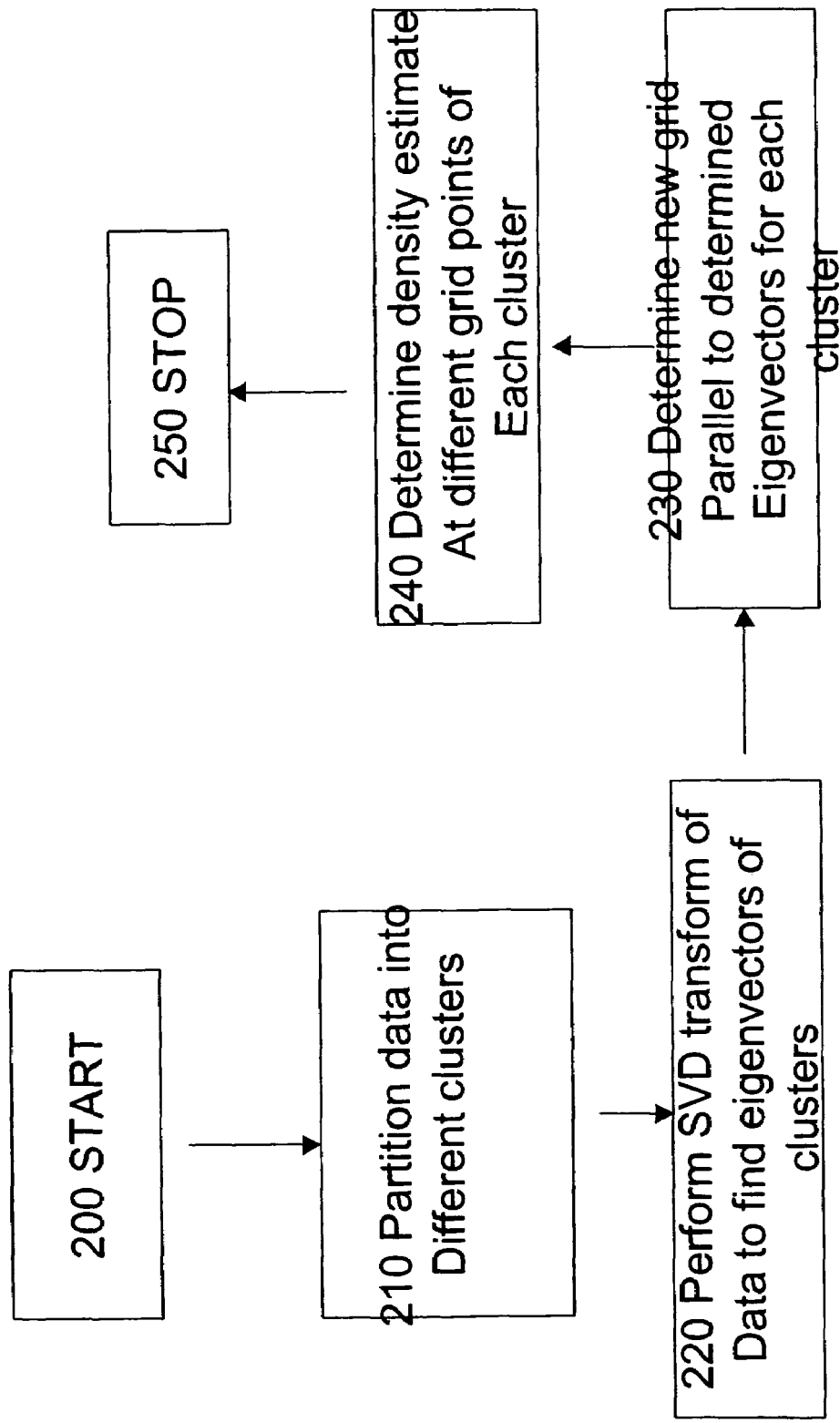
FIG. 3 is a schematic illustration of estimating the density of data points.

In FIG. 3, there is set forth a process (starting at 200 and ending at 250) of finding a density estimate for the real data set (which may corresponding essentially to step 120 in FIG. 2). It is noted that the process of finding the density estimate for a high dimensional data set can be very difficult in practice. This is because it is often not possible to reliably estimate the density of a very high dimensional data set since, in the high dimensional case, the multi-variate relationships between the different data points cannot be easily maintained. Consequently, it is important to develop a system in which the densities can be estimated effectively without adding too much noise to the process.

In order to achieve this goal, there are preferably utilized the following two different techniques:

(1) Create clusters of the data so as to perform the density estimation on local partitions of the data.
(2) Use SVD to transform the data so that it is possible to create the grid in the principal component directions of the data.

It is noted that important principal component directions preferably need to be discretized to a greater extent than the directions which have very little variance.

In the step 210, data is preferably partitioned into clusters. This is achieved in step 210. The process of clustering is preferably performed by using a k-means approach in which the clusters are created using a set of k centroids around which they are built. By constructing the density separately for each cluster, it is possible to create more refined summaries of the data.

In step 220, a SVD transform is preferably performed to find the eigenvector summaries of the data. A grid is then determined at 230. The eigenvectors transform the data to a new axis-system in which the second order correlations are removed. Such a representation can be useful in a variety of situations in which the data can be represented using a few dimensions and the dimensionality of the grid can be greatly reduced. A few dimensions are preferably picked which have the greatest variance and represent the data along a grid discretization in this transformed axis system. The grid resolution along each eigenvector is proportional to the length of the eigenvector in the corresponding direction. By reducing the dimensionality of the data, it is also possible to reduce the number of data points at which the density needs to be computed.

Once the grid has been determined (230), one preferably determines the density estimate at each relevant grid point, at 240. The density estimate at each grid point is found using the process of kernel density estimation. The process of kernel density estimation constructs density estimates from a discrete set of data points by summing up the contributions of a number of different data points. A typical kernel function such as the Gaussian function approximates the density at a given point as the sum of the Gaussian contributions of different data points. This is achieved in step 240. To follow is a discussion of how these density estimates are used to generate the data points synthetically. It is noted that once the SVD has been performed on the data, one can use a variety of methods to prune the part of the data with the least variance. In particular, one can preferably remove those axis directions which have the least variance in the data space.

Figure 4:
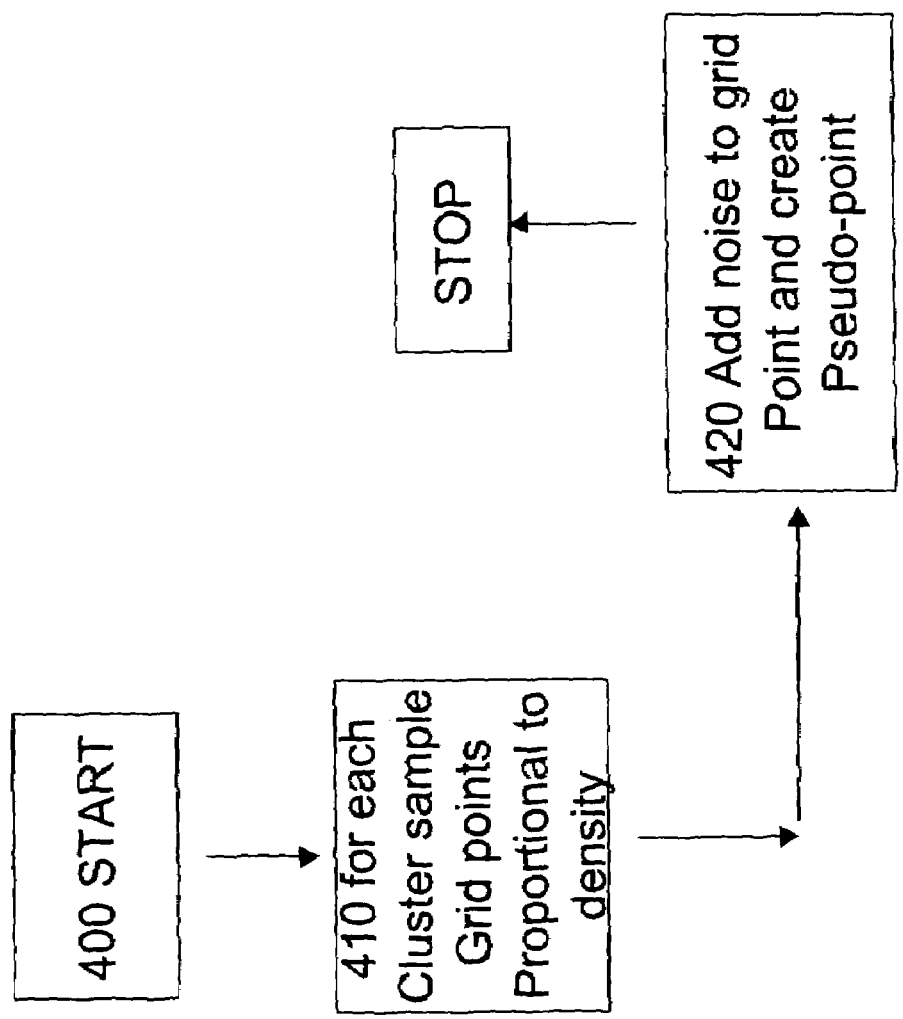
FIG. 4 is a schematic illustration of using density estimates in order to generate synthetic data points.

In FIG. 4, there is illustrated a process (starting at 400) of generating the synthetic data from the density estimates, and may essentially correspond to step 125 from FIG. 2. Preferably, the first step 410 is to sample the grid points proportional to their density. In step 420, the grid point is preferably sampled and noise is added in order to construct the final set of data points. This final set of data points can be generated in a number of ways. In fact, both the number and relative density of the data points can be varied considerably for the final results. It is also noted that the addition of noise is made necessary (or at least highly desirable) by the fact that within a given grid range, one has to make normalizing assumptions of the location of the data point within that grid square. Such assumptions can be useful in generating a data set which spans the entire domain of the data.

Figure 5:
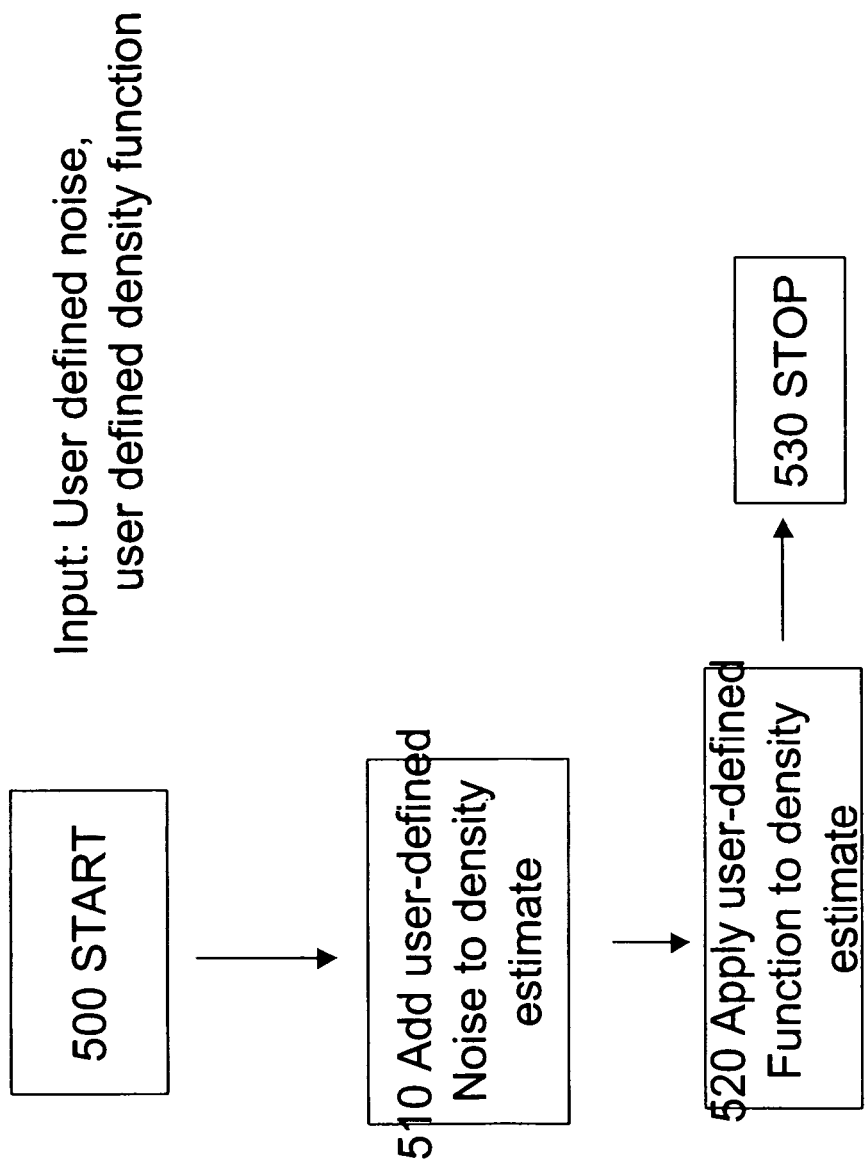
FIG. 5 is a schematic illustration of how a variety of distortions may be applied in order to improve density estimates.

In FIG. 5, there is illustrated a process (starting at 500 and ending at 530) of applying functional transforms in order to improve the quality of the final pseudo-data generated. (This process may essentially correspond to step 130 from FIG. 2.) This can be achieved in one of two ways: by applying a transformation function to the density estimate; or by explicitly adding noise to the density estimate. In step 510, user-defined noise is preferably added to the density estimate. This user-defined noise can be utilized in order to test the sample data with different data sets which have varying degrees of difficulty for the data mining algorithm. The second technique used is that of application of user-defined distance functions. Such functions can change the nature of the underlying application. In step 520, such functions are applied in order to distort or change the shape of the underlying clusters in the data. (It should be understood that steps 510 and 520 can be performed together or individually. Thus, steps 510 and 520 could conceivably represent distinct alternatives to one another, while in other instances they could be performed one after the other in sequence.)

In accordance with a variant embodiment of the present invention, the process contemplated hereinabove can also be used in order to generate data streams of varying levels of evolution. A primary approach which can preferably be used to generate such records is to utilize a density estimation method to construct density profiles of varying data sets. A convex combination of these density profiles can be used to generate a new density profile which reflects varying aspects of the evolution process. It is noted that the use of such an approach is particularly advantageous from the point of view of evolving data streams, since we can vary the convex combination in order to change the nature of the generated data stream.

Figure 6:
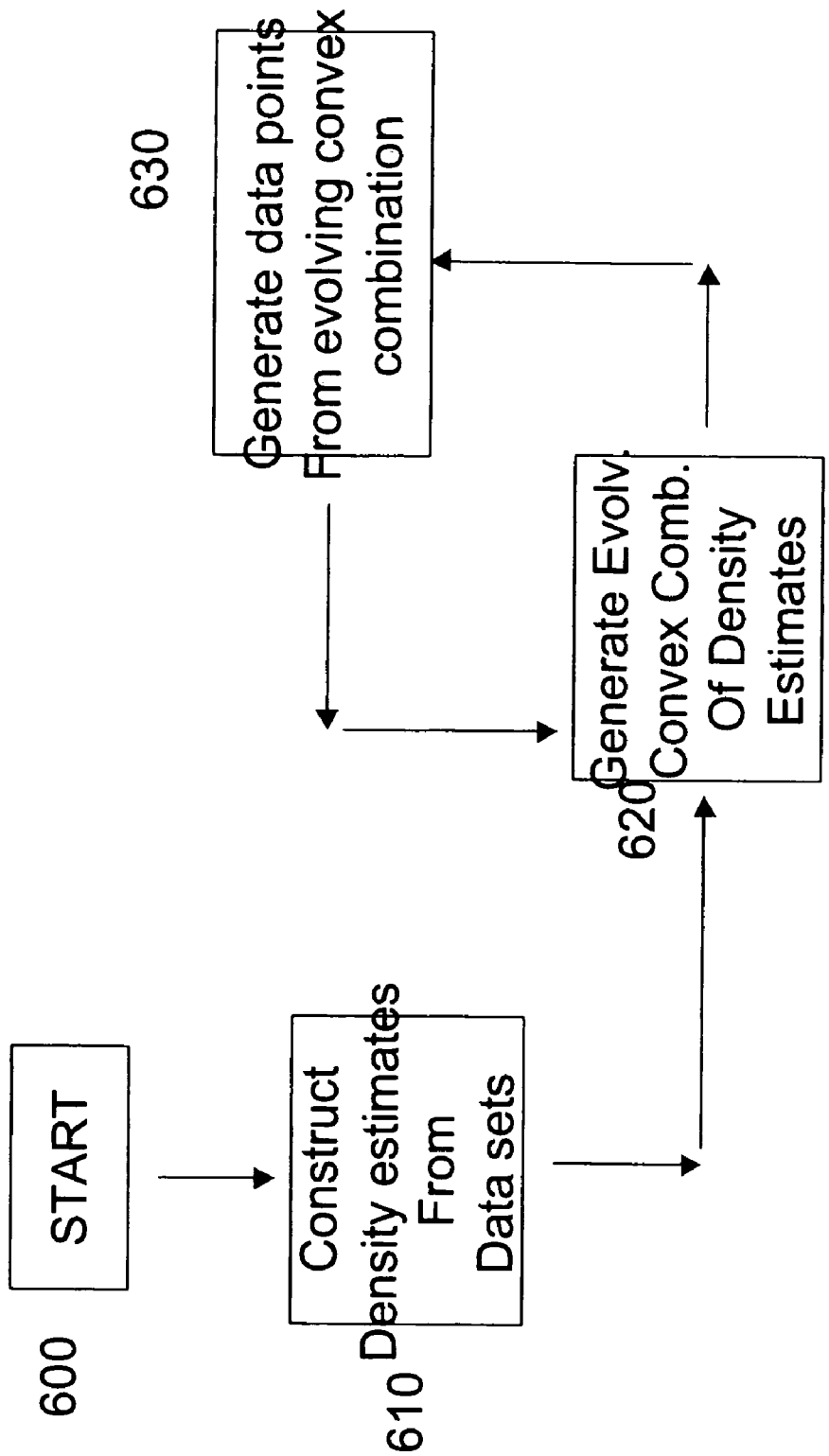
FIG. 6 is a schematic illustration of a process of constructing a density estimate from a real data stream.

In FIG. 6, such a process of density estimation illustrated (starting at 600). In step 610, one preferably constructs the density estimates from the different data sets; this can be essentially the same as the process of FIG. 3. Once these density profiles have been generated, they are preferably used iteratively in order to generate the continuously evolving data stream. In step 620, there is preferably generated the convex combination of the different density estimates. This convex combination can be varied in each iteration at a rate which depends upon the level of evolution of the data stream. Once the combined density estimate is generated, it is preferably used to construct a new set of data points; this is achieved in step 630. The number of data points generated in each iteration can also be varied depending upon the desired level of evolution.

In brief recapitulation, there has been broadly contemplated herein a new method for synthetic data generation with the use of real data sets. In order to achieve this objective, there is preferably employed a combination of clustering and SVD. This combination is useful to find the required density to the desired level of accuracy. In addition, it is possible to add perturbations to the data which make it possible to examine different variations of the underlying data set.

It is to be understood that the present invention, in accordance with at least one presently preferred embodiment, includes an arrangement for clustering data to create partitions, an arrangement for constructing transforms of clustered data in a transformed space, an arrangement for generating data points via employing grid discretization in the transformed space and an arrangement for employing density estimates of the generated data points to generate synthetic pseudo-points. Together, these elements may be implemented on at least one general-purpose computer running suitable software programs. They may also be implemented on at least one integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirely herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A machine implemented method comprising:
utilizing a central processing unit of a server to execute a program of instructions stored in a memory to perform method steps for constructing a density based synthetic data set from a real data set, the program of instructions comprising:
 (a) instructions for accepting the real data set at the server;
 (b) instructions for partitioning the real data set into clusters;
 (c) instructions for, after partitioning the real data set into clusters, creating density estimates separately for each cluster;
 wherein said instructions for creating density estimates separately for each cluster comprise:
  instructions for performing an SVD transform to find eigenvector summaries;
  instructions for determining a grid, wherein a grid resolution along each eigenvector is proportional to a length of an eigenvector in a corresponding direction;
  instructions for determining a density estimate at each grid point utilizing kernel density estimation; and
  instructions for sampling grid points proportional to density to construct a final set of data points;
 wherein the final set of data points comprise the density based synthetic data set and further wherein the density based synthetic data set simulates the distribution of the real data set for data mining computations and simulations; and
 (d) instructions for transmitting the density based synthetic data set from the server to a client device.

2. The machine implemented method according to claim 1, wherein the instructions further comprise:
instructions for adding user-defined noise to the density estimates.

3. The machine implemented method according to claim 1, wherein the instructions further comprise:
instructions for applying a user-defined distance function to change cluster shapes.

4. An apparatus comprising:
at least one central processing unit; and
at least one storage device tangibly embodying instructions that when executed by the at least one central processing unit enable the apparatus to:
 receive a real data set from a client device;
 generate density estimates of the real data set;
 construct a final set of synthetic data points based on the density estimates; and
 send the final set of synthetic data points to the client device;
wherein the final set of synthetic data points comprises a density based synthetic data set that simulates the distribution of the real data set for data mining computations and simulations;
wherein the instructions that when executed by the at least one central processing unit further enable the apparatus to:
 create clusters of data of the real data set utilizing a k-means approach;
 thereafter perform an SVD transform to find eigenvector summaries;
 thereafter determine a grid, wherein a grid resolution along each eigenvector is proportional to a length of an eigenvector in a corresponding direction; and
 determine a density estimate at each grid point using kernel density estimation;

wherein:
the kernel density estimation constructs density estimates from a discrete set of data points via summing up contributions of different data points;
axis directions having a least variance in a data space are removed; and
grid points are sampled and noise is added in order to construct the final set of synthetic data points.

5. The apparatus according to claim 4, wherein the instructions when executed by the at least one central processing unit further enable the apparatus to add user-defined noise to the density estimates.

6. The apparatus according to claim 4, wherein the instructions when executed by the at least one central processing unit further enable the apparatus to apply a user-defined distance function to change cluster shapes.

7. A system comprising:
a client device; and
a server having at least one central processing unit, the server being in operative connection with the client device;
wherein the server is configured to:
(a) receive a real data set from a client device;
(b) generate density estimates of the real data set and construct a final set of synthetic data points based on the density estimates, wherein to generate density estimates of the real data set and construct a final set of synthetic data points further comprises:
creating clusters of data of the real data set utilizing a k-means approach;
thereafter performing an SVD transform to find eigenvector summaries;
thereafter determining a grid, wherein a grid resolution along each eigenvector is proportional to a length of an eigenvector in a corresponding direction; and
determining a density estimate at each grid point using kernel density estimation;
wherein:
the kernel density estimation constructs density estimates from a discrete set of data points via summing up contributions of different data points;
axis directions having a least variance in a data space are removed; and
grid points are sampled and noise is added in order to construct the final set of synthetic data points; and
(c) send the final set of synthetic data points to the client device;
wherein the final set of synthetic data points comprises a density based synthetic data set that simulates the distribution of the real data set for data mining computations and simulations.

8. The apparatus according to claim 7, wherein the server is further configured to add user-defined noise to the density estimates.

9. The apparatus according to claim 7, wherein the server is further configured to apply a user-defined distance function to change cluster shapes.

* * * * *